US012580097B2

(12) United States Patent
Reis et al.

(10) Patent No.: US 12,580,097 B2
(45) **Date of Patent: *Mar. 17, 2026**

(54) MC CABLE WITH TEARABLE ASSEMBLY TAPE

(71) Applicant: AFC Cable Systems, Inc., New Bedford, MA (US)

(72) Inventors: Paul Reis, New Bedford, MA (US); David Campbell, Bristol, RI (US)

(73) Assignee: AFC CABLE SYSTEMS, INC., New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,447

(22) Filed: Jul. 26, 2023

(65) Prior Publication Data

US 2023/0368940 A1 Nov. 16, 2023

Related U.S. Application Data

(63) Continuation of application No. 16/837,382, filed on Apr. 1, 2020, now Pat. No. 11,715,583.

(Continued)

(51) Int. Cl.

*H01B 7/18* (2006.01)
*H01B 7/22* (2006.01)

(Continued)

(52) U.S. Cl.

CPC ............. *H01B 7/184* (2013.01); *H01B 7/225* (2013.01); *H01B 7/00* (2013.01); *H01B 7/02* (2013.01); *H01B 7/0241* (2013.01); *H01B 7/025* (2013.01); *H01B 7/0258* (2013.01); *H01B 7/0283* (2013.01); *H01B 7/04* (2013.01); *H01B 7/08* (2013.01); *H01B 7/17* (2013.01); *H01B 7/185* (2013.01); *H01B 7/1855* (2013.01); *H01B 7/186* (2013.01); *H01B 7/208* (2013.01);

(Continued)

(58) Field of Classification Search

CPC .......... H01B 7/00; H01B 7/02; H01B 7/0241; H01B 7/025; H01B 7/0258; H01B 7/0283; H01B 7/04; H01B 7/08; H01B 7/17; H01B 7/184; H01B 7/185; H01B 7/1855; H01B 7/186; H01B 7/208; H01B 7/225; H01B 9/00; H01B 9/02; H01B 9/021; H01B 9/023; H01B 9/024; H01B 9/025; H01B 9/04; H01B 11/00; H01B 11/02; H01B 11/08; H01B 11/10; H01B 11/1834; H01B 11/1847; H01B 11/1852

See application file for complete search history.

(56) References Cited

U.S. PATENT DOCUMENTS 1,430,042 A * 9/1922 Von Raczynski ...... H01B 7/226 174/109
2,143,072 A * 1/1939 Johnson ................ E21B 43/086 166/231

(Continued)

FOREIGN PATENT DOCUMENTS

JP S5820423 U 2/1983
JP S6111221 A 1/1986
JP 2008120415 A 5/2008

*Primary Examiner* — Paresh Paghadal
(74) *Attorney, Agent, or Firm* — KDW FIRM PLLC

(57) ABSTRACT

Disclosed is an armored cable assembly including a core having a notched assembly tape about a plurality of conductors. A metal sheath surrounds the core.

14 Claims, 5 Drawing Sheets

Related U.S. Application Data

(60) Provisional application No. 62/986,043, filed on Mar. 6, 2020.

(51) Int. Cl.

| | |
|---|---|
| *H01B 7/00* | (2006.01) |
| *H01B 7/02* | (2006.01) |
| *H01B 7/04* | (2006.01) |
| *H01B 7/08* | (2006.01) |
| *H01B 7/17* | (2006.01) |
| *H01B 7/20* | (2006.01) |
| *H01B 9/00* | (2006.01) |
| *H01B 9/02* | (2006.01) |
| *H01B 9/04* | (2006.01) |
| *H01B 11/00* | (2006.01) |
| *H01B 11/02* | (2006.01) |
| *H01B 11/08* | (2006.01) |
| *H01B 11/10* | (2006.01) |
| *H01B 11/18* | (2006.01) |

(52) U.S. Cl.

CPC .................. *H01B 9/00* (2013.01); *H01B 9/02* (2013.01); *H01B 9/021* (2013.01); *H01B 9/023* (2013.01); *H01B 9/024* (2013.01); *H01B 9/025* (2013.01); *H01B 9/04* (2013.01); *H01B 11/00* (2013.01); *H01B 11/02* (2013.01); *H01B 11/08* (2013.01); *H01B 11/10* (2013.01); *H01B 11/1834* (2013.01); *H01B 11/1847* (2013.01); *H01B 11/1852* (2013.01)

(56) References Cited

U.S. PATENT DOCUMENTS

| | | | | |
|---|---|---|---|---|
| 2,597,222 | A | 5/1952 | Bennett | |
| 2,599,857 | A | 6/1952 | Charles | |
| 2,929,161 | A | 3/1960 | Kenneth | |
| 5,153,381 | A | 10/1992 | Ganatra | |
| 5,350,885 | A | 9/1994 | Falciglia | |
| 9,273,806 | B2 | 3/2016 | Graham | |
| 2009/0056824 | A1 | 3/2009 | Stikeleather | |
| 2011/0077678 | A1 * | 3/2011 | Ryan | A61B 1/0055 606/191 |
| 2012/0273248 | A1 | 11/2012 | Tamaki | |
| 2016/0196897 | A1 * | 7/2016 | Straniero | H01B 7/18 174/102 R |
| 2016/0211060 | A1 | 7/2016 | Akimoto | |
| 2016/0236631 | A1 | 8/2016 | Kamijo | |
| 2017/0355833 | A1 * | 12/2017 | Klun | C08K 5/3435 |
| 2018/0301245 | A1 | 10/2018 | Glew | |
| 2019/0385764 | A1 * | 12/2019 | Hayakawa | H01B 7/1845 |

* cited by examiner

MC CABLE WITH TEARABLE ASSEMBLY TAPE

CROSS-REFERENCE TO RELATED APPLICATIONS

This is a continuation application of co-pending U.S. patent application Ser. No. 16/837,382, filed on Apr. 1, 2020, which claims priority to U.S. provisional application Ser. No. 62/986,043, filed Mar. 6, 2020, the entirety of which applications are incorporated by reference herein.

BACKGROUND OF THE DISCLOSURE

Field of the Disclosure

The present disclosure relates generally to armored cables. More particularly, the present disclosure relates to an MC cable including a tearable assembly tape.

Discussion of Related Art

Armored cable ("AC") and Metal-Clad ("MC") cable provide electrical wiring in various types of construction applications. The use, installation, and construction specification of these cables should satisfy certain standards as set forth, for example, in the National Electric Code® (NEC). (National Electrical Code and NEC are registered trademarks of National Fire Protection Association, Inc.) These cables house electrical conductors within a metal armor. The metal armor may be flexible to enable the cable to bend, while still protecting the conductors against external damage during and after installation.

The cables may be wrapped or otherwise covered with an adhesive assembly tape, which serves to keep the cables together. It is often necessary to tear the adhesive tape while installing, fixing, and/or removing the cables. However, due to the strength of many types of these adhesives tapes, it is often difficult for technicians to easily tear. It with respect to this and other drawbacks that the present disclosure is provided.

SUMMARY OF THE DISCLOSURE

In one approach, a cable assembly may include a plurality of conductors contained within a metal sheath, and an assembly tape wrapped about the plurality of conductors, the assembly tape including a plurality of notches formed along an edge.

In another approach, A metal-clad (MC) cable assembly may include a core, having a plurality of conductors cabled together, and an assembly tape wrapped around the plurality of conductors, wherein an inner surface and an outer surface are non-adhesive. The MC cable may further include a metal sheath surrounding the core.

BRIEF DESCRIPTION OF THE DRAWINGS

The accompanying drawings illustrate exemplary approaches of the disclosure so far devised for the practical application of the principles thereof, and in which.

Figure 1:
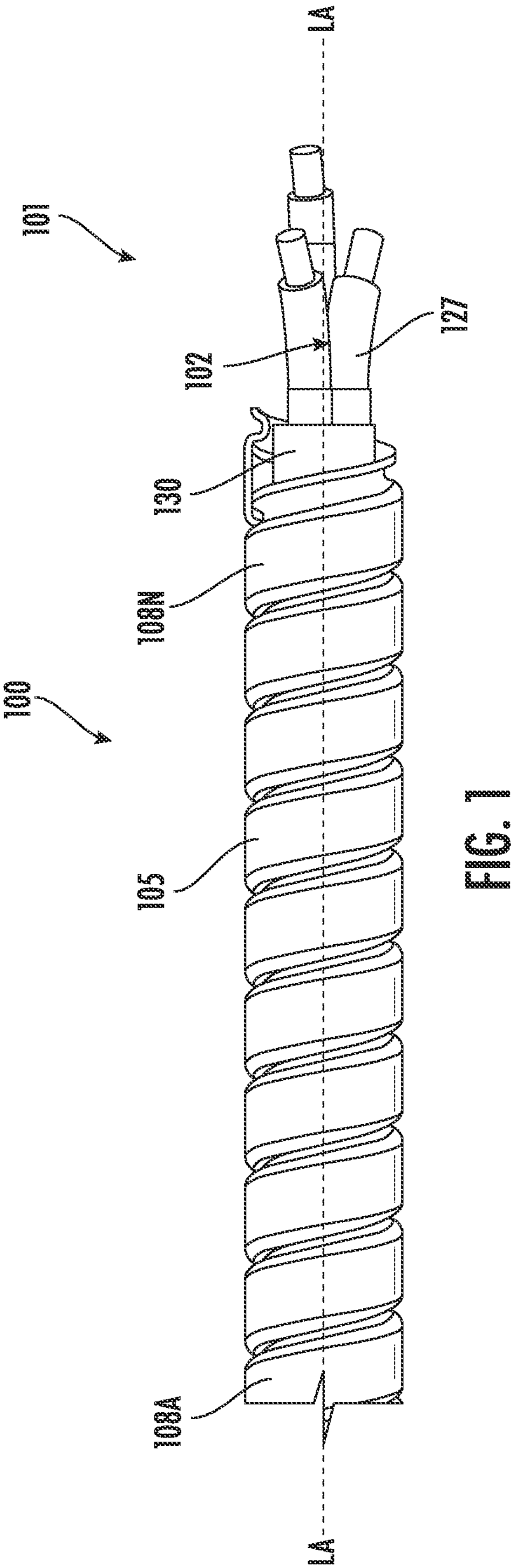
FIG. 1 is a side view of an armored cable assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed armored cable assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide a cable assembly including a notched assembly tape wrapped around the core. The notched assembly tape makes it easier for an electrician to tear without assistance from a tool. Therefore, the assembly tape of the present disclosure provides an economic and efficient solution for ensuring the tape to be easily cut by a user's hand, e.g., in a transverse direction, without negatively impacting a tensile strength of the tape along a longitudinal direction thereof.

Figure 2:
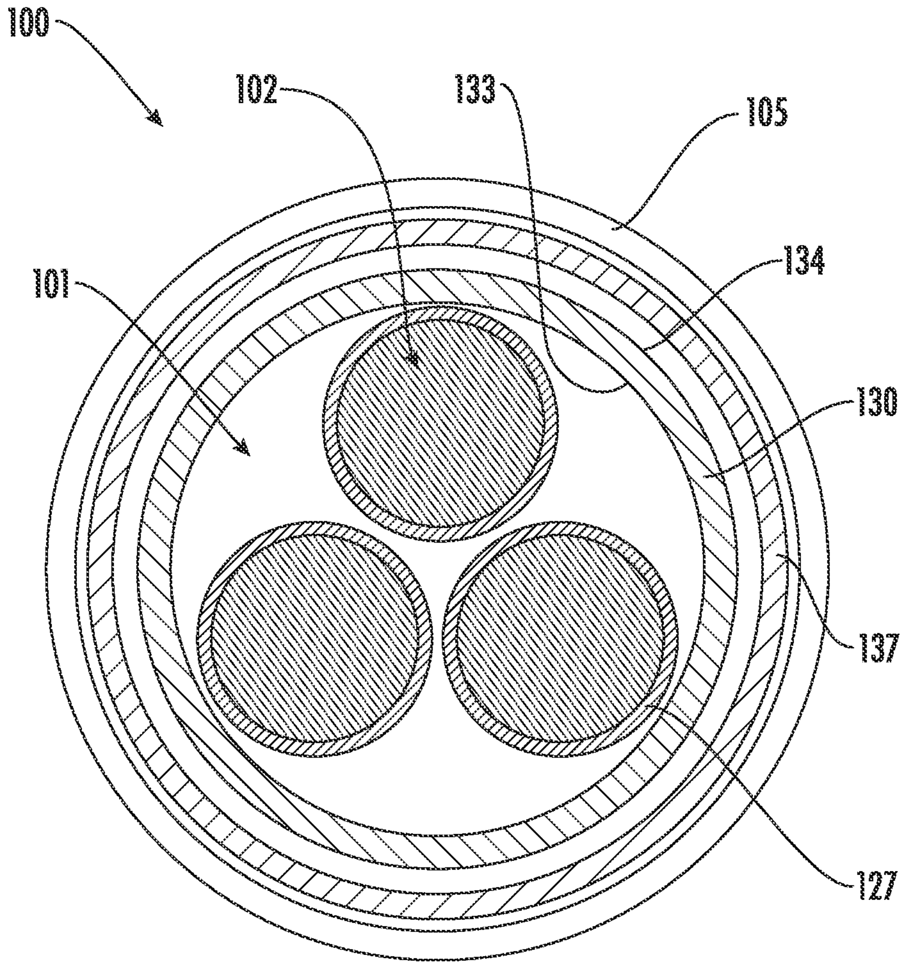
FIG. 2 is a cross-sectional view of the armored cable assembly of FIG. 1 according to embodiments of the present disclosure.
Figure 3:
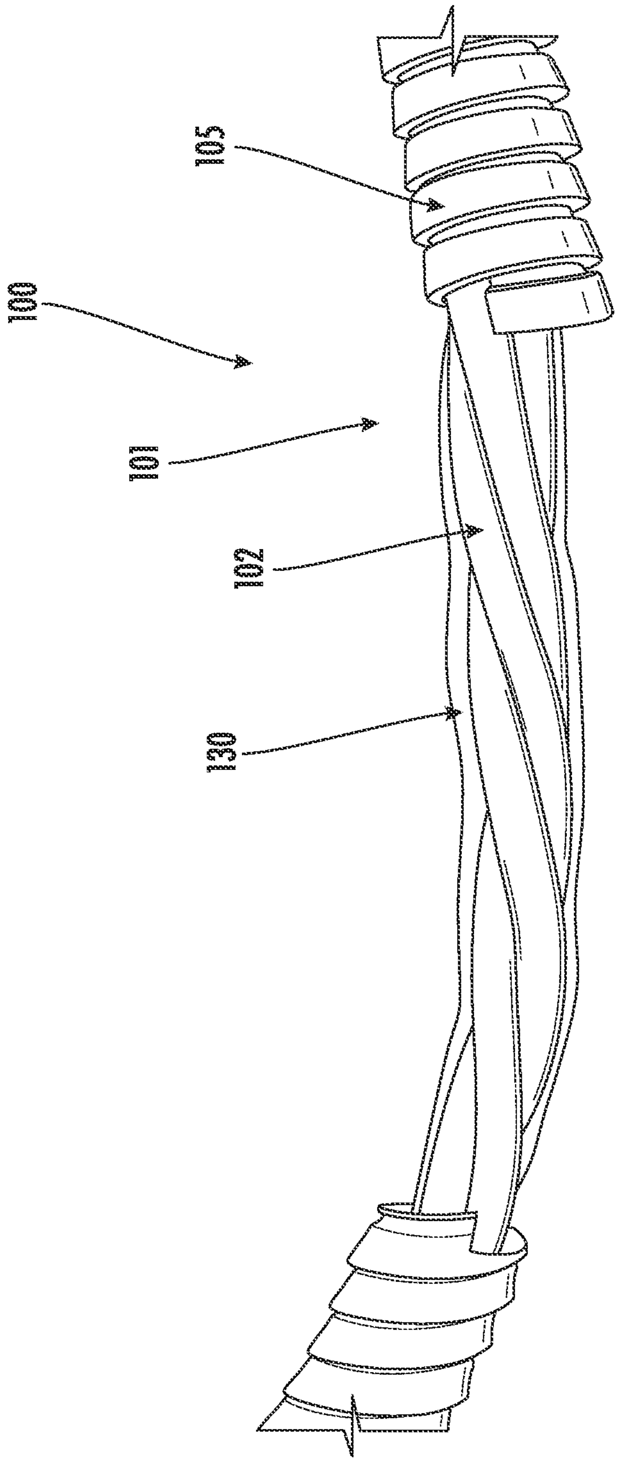
FIG. 3 is a side view of the armored cable assembly of FIG. 1 with a portion of a metal sheath removed according to embodiments of the present disclosure.

Referring now to FIGS. 1-3, an exemplary cable assembly 100 according to an embodiments of the present disclosure will be described. As shown, the armored cable assembly (hereinafter "assembly") 100 may include a core 101 having a plurality of conductors 102 extending either parallel to one another or cabled together, in either a right or left hand lay. The conductors 102 generally extend along a lengthwise axis 'LA' of the assembly 100. The conductors 102 may be surrounded by an assembly tape 130 and enclosed by a metal sheath 105.

Although non-limiting, the assembly 100 may be a Metal-Clad (MC) cable assembly. MC cable is manufactured according to UL standard 1569 and includes no limit on the number of electrical conductors 102. The conductor assembly may contain an insulated grounding conductor cabled together with a plurality of power conductors.

The metal sheath 105 may be formed as a seamless or welded continuous sheath having a generally circular cross section with a thickness of about 0.005 to about 0.060 inches. The metal sheath 105 may be formed from flat or shaped metal strip, the edges of which are helically wrapped and interlock to form a series of bands or revolutions 108A-108N along the length of the conductors 102. In this manner, the metal sheath 105 allows the resulting assembly 100 to have a desired bend radius sufficient for installation within a building or structure. The metal sheath 105 may also be formed into shapes other than generally circular such as, for example, rectangles, polygons, ovals and the like. The metal sheath 105 provides a protective metal covering around the core 101. The metal sheath 105 may be used as an equipment grounding conductor if the ohmic resistance satisfies the requirements of UL 1569.

In some embodiments, as best shown in FIG. 2, an outer jacket 137 (e.g., PVC) 137 may be provided along the metal sheath 105. The outer jacket 137 may be along an exterior or interior of the metal sheath 105. This may be particularly useful in wet rated applications. In yet other embodiments, the outer jacket 137 may be formed (e.g., extruded) over an outer surface of the assembly tape 130. Additionally, the outer jacket 137 may be used to provide additional mechanical protection to the core 101. In exemplary approaches, the outer jacket 137 may be a thermoplastic or a thermoset polymeric material, having a thickness in the range of 30-85 mils.

Although the core 101 is not limited to any specific type, arrangement, or number of components, it will be appreciated the conductors 102 may include a plurality of stranded or solid electrical conductors having one or more insulation and/or jacketing layer(s) 127 disposed thereupon. In one example, a concentric insulation layer is formed over the bare electrical conductor, and a jacket layer is extruded over the insulation layer. In some embodiments, the conductors 102 are power conductors. In some embodiments, at least one of the conductors 102 includes an insulated ground conductor. Although not shown, it'll be appreciated that the core 101 may further include a bonding/grounding conductor directly adjacent the metal sheath 105. In one approach, the bonding/grounding conductor may be a 10 AWG bare aluminum bonding/grounding conductor. Furthermore, in another approach, the core 101 may additionally include a cabled set of conductors (e.g., twisted pair) operating as class 2 or class 3 circuit conductors, as defined by Article 725 of the NEC®. The cabled set of conductors may be separated from the conductors 102 by an assembly jacket layer (e.g., PVC), which may have a thickness in the range of 5-80 mils. Although non-limiting, the assembly jacket layer may be formed about the cabled set of conductors or the conductors 102.

In some embodiments, the conductors 102 may define an NEC® Type thermoplastic fixture wire nylon (TFN), thermoplastic flexible fixture wire nylon (TFFN), thermoplastic high heat resistant nylon (THHN), thermoplastic heat and water-resistant nylon (THWN) or THWN-2 insulated conductors. In other approaches the conductors 102 may define an NEC® Type thermoplastic heat and water resistant (THW), thermoplastic high heat and water resistant (THHW), cross-linked polyethylene high heat-resistant water-resistant (XHHW) or XHHW-2 insulated conductors. In one exemplary approach, the insulation layer 127 includes a polyvinylchloride (PVC) layer having a thickness of approximately 15-125 mil, and a nylon layer having a thickness of approximately 4-9 mil. Although non-limiting, each of the conductors 102 can have a size between 24 AWG and 1000 KCMIL such that conductors 102 are configured to conduct a voltage between zero (0) and approximately 600 Volts.

As shown, a binder or assembly tape 130 may be wrapped around the conductors 102. The assembly tape 130 may be wrapped about an exterior of each of the conductors 102 to increase mechanical and electrical performance of the assembly 100. Although non-limiting, the assembly tape 130 may be made from a biaxially oriented polypropylene (BOPP) film, mono-oriented polypropylene (MOPP) film, or cast polypropylene (CPP) film. Other types of tape materials may also be used, for example, as set forth in UL standard section 4.3.7. Although non-limiting, the assembly tape 130 may be made from a nylon, polyester, and/or paper. In some embodiments, polyester or polypropylene assembly tape may be flat or corrugated. In some embodiments, paper assembly tape may be treated.

The assembly tape 130 may include an inner surface 133 and an outer surface 134. The inner surface 133 may be in direct contact with an exterior of the insulation layer 127. In exemplary embodiments, the inner surface 133 and/or the outer surface 134 of the assembly tape 130 are non-adhesive. In embodiments having a bonding/grounding conductor, the assembly tape 130 may be positioned between the bonding/grounding conductor and the conductors 102. As will be described in greater detail herein, the assembly tape 130 may include a series of notches, partial tears, slices, cuts, crack, holes, etc., along one or both edges to assist with manual tearing of the assembly tape 130.

Although not shown, it will be appreciated that assembly 100 may include one or more filler members within the metal sheath 105. In one approach, a longitudinally oriented filler member is disposed within the metal sheath 105 adjacent to the plurality of conductors 102 to push the plurality of conductors 102 radially outward and into contact with an inside surface of metal sheath 105. The filler member can be made from any of a variety of fiber or polymer materials. Furthermore, the filler member can be used with MC Cable assemblies having any number of insulated conductor assemblies.

Figure 4:
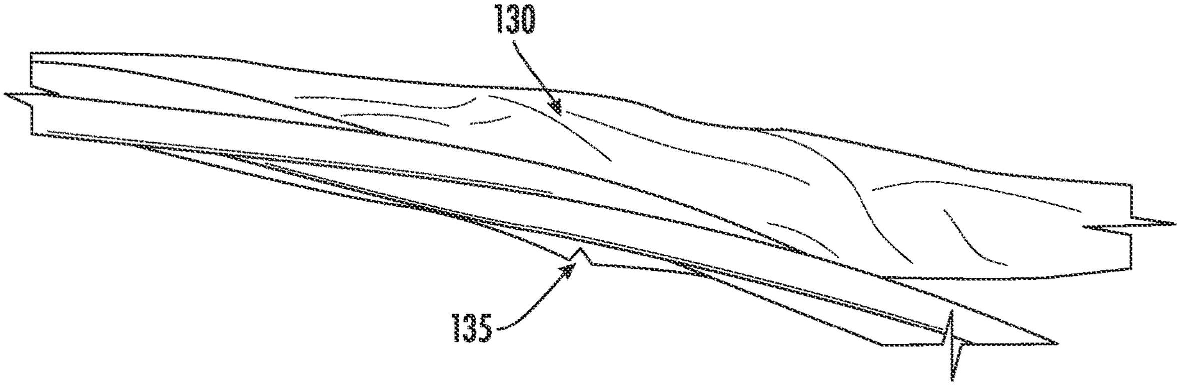
FIG. 4 is a side perspective view of an assembly tape of FIG. 1 according to embodiments of the present disclosure.
Figure 5:
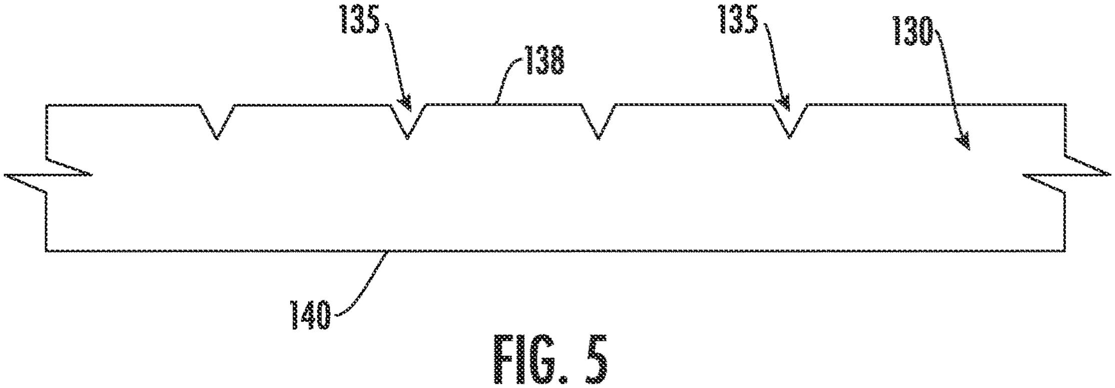
FIG. 5 is a top view of an assembly tape of the armored cable assembly of FIG. 1 according to embodiments of the present disclosure.

It will be further appreciated that the core 101 may include a thin marker tape (not shown) that contains technical information for the assembly 100. The marker tape may extend along the lengthwise axis, LA, twisted in with the conductors 102. In other embodiments, the marker tape may be paid parallel to the conductors 102. Turning now to FIGS. 4-5, the assembly tape 130 will be described in greater detail. As shown, the assembly tape 130 may include a series of notches 135 formed along a first edge 138 and/or a second edge 140 thereof. In this embodiment, the notches 135 extend inwardly, e.g., towards the second edge 140. Although shown as generally triangular shaped, it'll be appreciated that the notches 135 may take on a variety of shapes and sizes. The notches 135 may be spaced apart from one another at regular or irregular intervals. For example, the notches 135 may be formed 1-3 inches apart along the first edge 138. It will be appreciated that the notches 135 should be big enough for visibility purposes, but small enough to preventing significantly decreasing overall strength of the assembly tape 130. In some embodiments, the assembly tape 130 can be printed with a reference line or indicator to highlight the notches 135. The notches 135 may be formed in the assembly tape 130 using any variety of techniques.

Figure 6:
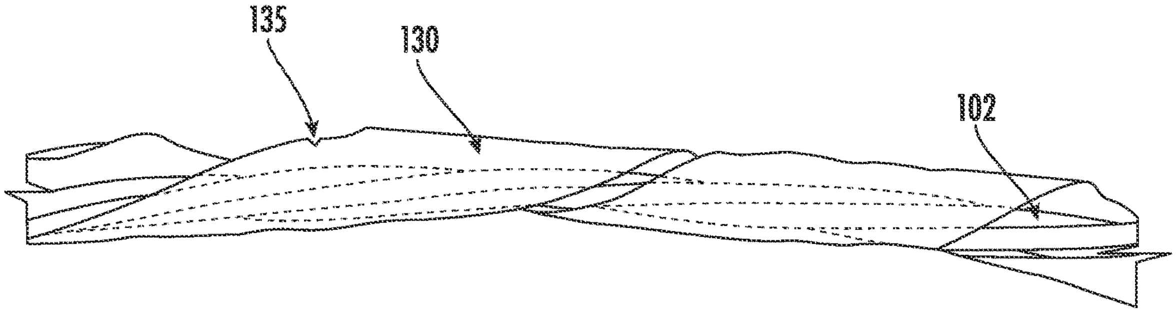
FIG. 6 is a side perspective view of an assembly tape according to embodiments of the present disclosure.
Figure 7:
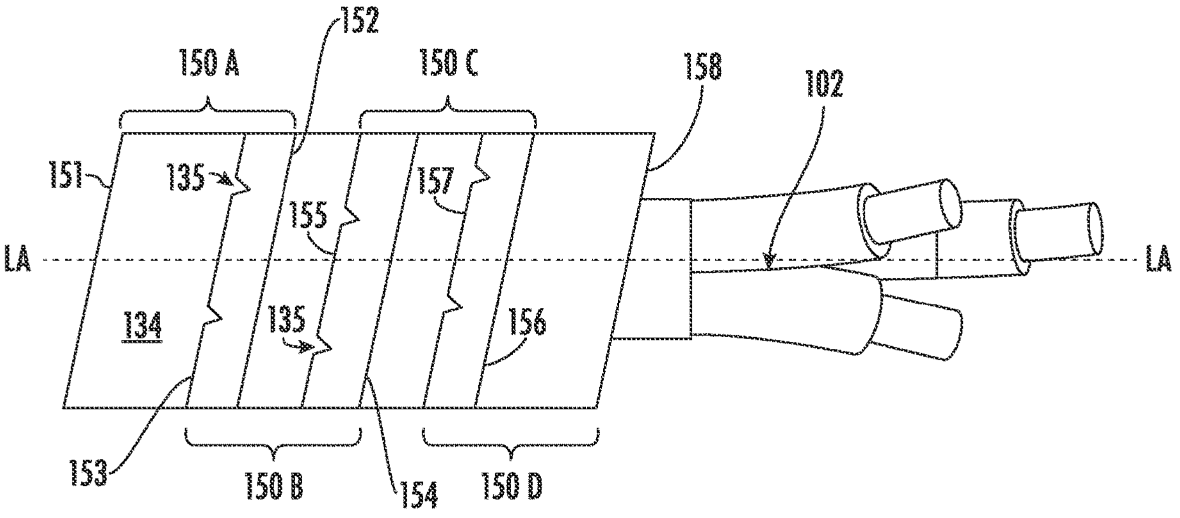
FIG. 7 is a side perspective view of an assembly tape according to embodiments of the present disclosure.

Turning now to FIGS. 6-7, an arrangement of the assembly tape 130 according to embodiments of the disclosure will be described in greater detail. As shown, the assembly tape 130 may be helically or longitudinally wrapped about the conductors 102. As best shown in FIG. 7, the assembly tape 130 may be defined by a series of revolutions or bands 150A-150N partially overlapping with one another along the lengthwise axis, LA. Band 150A may include a first edge 151 opposite a second edge 152, band 150B may include a third edge 153 opposite a fourth edge 154, band 150C may include a fifth edge 155 opposite a sixth edge 156, and band 150D may include a seventh edge 157 opposite an eighth edge 158. Each of the bands 150A-150N may overlap with an adjacent band by approximately 10-50%. For example, the third edge 153 of band 150B may overlap (i.e., cover) the second edge 152 and a portion of band 150A. Similarly, the fifth edge 155 of band 150C may overlap the fourth edge 154 and a portion of band 150B. As a result, each of the notches 135 is provided atop or over the outer surface 134 of the assembly tape 130 to prevent any portion of the conductors 102 from being exposed when wrapped. Therefore, impact to the mechanical and electrical performance of the assembly 100 is minimal. Unlike some assembly tape approaches having perforations through the assembly tape, a 10 kv dielectric insulation capability of the assembly tape 130 can be maintained.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A cable armor, comprising:

a sheath; and an assembly tape within the sheath, the assembly tape arranged as a plurality of adjacent bands each having a width defined by a first edge and a second edge, wherein the first edge of a first band of the plurality of adjacent bands overlaps with the second edge of a second band of the plurality of adjacent bands, wherein the first and second bands are adjacent and in direct contact with one another, the assembly tape including a plurality of notches formed only in the first edge, wherein no notches are formed in the second edge, wherein the plurality of notches are positioned directly atop an exterior surface of the assembly tape, and wherein the assembly tape is made entirely from a biaxially oriented polypropylene (BOPP) film, a mono-oriented polypropylene (MOPP) film, or a polypropylene film.

2. The cable armor of claim 1, wherein an entirety of a perimeter of each notch of the plurality of notches is positioned directly atop the exterior surface of the assembly tape.

3. The cable armor of claim 1, wherein the plurality of notches extend inwardly from the first edge.

4. The cable armor of claim 1, wherein the plurality of notches extend entirely through the assembly tape, between an interior surface and the exterior surface of the assembly tape, and wherein the plurality of notches remain exposed from an outside of the assembly tape when the assembly tape is wrapped about a plurality of conductors.

5. The cable armor of claim 1, wherein the assembly tape contains no adhesive extending along an interior surface or the exterior surface.

6. A cable assembly, comprising:

a core, comprising:

plurality of conductors cabled together; and an assembly tape wrapped around the plurality of conductors, wherein an inner surface and an outer surface of the assembly tape are non-adhesive, wherein the assembly tape is arranged as a plurality of adjacent bands each having a width defined by a first edge and a second edge, wherein the first edge of a first band of the plurality of adjacent bands overlaps with the second edge of a second band of the plurality of adjacent bands, wherein a plurality of notches are formed only in the first edge of the first band, wherein no notches are formed in the second edge, and wherein the assembly tape is made entirely from a biaxially oriented polypropylene (BOPP) film, a mono-oriented polypropylene (MOPP) film, a polypropylene (CPP) film, or polyester; and a metal sheath surrounding the core.

7. The cable assembly of claim 6, wherein the plurality of conductors are cabled in a left-hand or right-hand lay.

8. The cable assembly of claim 6, wherein the plurality of conductors are laid parallel to one another.

9. The cable assembly of claim 6, wherein the plurality of notches extend inwardly from the first edge towards the second edge, and wherein the plurality of notches are spaced apart from one another.

10. The cable assembly of claim 6, wherein the plurality of notches are spaced apart from one another at regular or irregular intervals along the first edge or the second edge, and wherein an entirety of a perimeter of each notch of the plurality of notches is positioned directly atop the outer surface of the assembly tape.

11. The cable assembly of claim 6, wherein the plurality of notches extend entirely through the assembly tape, between an interior surface and the outer surface of the assembly tape.

12. The cable assembly of claim 6, wherein the assembly tape is transparent or translucent.

13. The cable assembly of claim 6, further comprising an outer or inner jacket over the assembly tape or over the metal sheath.

14. A core of a metal-clad (MC) cable assembly, the core comprising:

a plurality of conductors; and an assembly tape wrapped around the plurality of conductors, wherein the assembly tape is arranged as a plurality of adjacent bands each having a width defined by a first edge and a second edge, wherein the first edge of a first band of the plurality of adjacent bands overlaps with the second edge of a second band of the plurality of adjacent bands, wherein a plurality of notches are formed only in the first edge of the first band, wherein no notches are formed in the second edge, and wherein the assembly tape is made entirely from a biaxially oriented polypropylene (BOPP) film, a mono-oriented polypropylene (MOPP) film, a polypropylene (CPP) film, or polyester.

* * * * *